(12) United States Patent
Wilson

(10) Patent No.: US 6,192,119 B1
(45) Date of Patent: Feb. 20, 2001

(54) TELEPHONE CONFERENCING SYSTEMS

(75) Inventor: Jeffrey Wilson, Fareham (GB)

(73) Assignee: Intellprop Limited, Guernsey (GB)

( * ) Notice: Under 35 U.S.C. 154(b), the term of this patent shall be extended for 0 days.

(21) Appl. No.: 09/142,263

(22) PCT Filed: Mar. 3, 1997

(86) PCT No.: PCT/GB97/00582

§ 371 Date: Sep. 3, 1998

§ 102(e) Date: Sep. 3, 1998

(87) PCT Pub. No.: WO97/33422

PCT Pub. Date: Sep. 10, 1997

(30) Foreign Application Priority Data

Mar. 4, 1996 (GB) .................................................. 9604625

(51) Int. Cl.[7] .................................................... H04M 3/42
(52) U.S. Cl. ........................................... 379/202; 379/205
(58) Field of Search .................................. 379/202, 205, 379/204, 207, 206, 201; 370/261

(56) References Cited

U.S. PATENT DOCUMENTS

| | | | |
|---|---|---|---|
| 4,475,189 | * 10/1984 | Herr et al. | 379/88.24 X |
| 4,577,065 | * 3/1986 | Frey et al. | 379/204 |
| 4,635,251 | 1/1987 | Stanley et al. . | |
| 5,408,526 | 4/1995 | McFarland et al. . | |
| 5,414,750 | 5/1995 | Bhagat et al. . | |
| 5,719,928 | * 2/1998 | Pinnell et al. | 379/114 X |
| 5,844,973 | * 12/1998 | Uenkatraman et al. | 379/116 X |

FOREIGN PATENT DOCUMENTS

| | | |
|---|---|---|
| 0 649 266 A2 | 4/1995 | (EP) . |
| 0 750 413 A2 | 12/1996 | (EP) . |
| 05145645 | 6/1993 | (JP) . |
| 05260192 | 10/1993 | (JP) . |
| 83/04359 | 12/1983 | (WO) . |
| 94/06236 | 3/1994 | (WO) . |

* cited by examiner

Primary Examiner—Creighton Smith
(74) Attorney, Agent, or Firm—Renner, Otto, Boisselle & Sklar, LLP

(57) ABSTRACT

A telephone conferencing system includes a voice services equipment (VSE) allowing a number of telephone calls to be connected together to form a conferencing function. The initiator of the telephone conference calls in on an incoming line and is asked by the VSE to give the telephone numbers of the desired other participants to the conference. These numbers are then stored in a participant number store and the system dials out to these telephone numbers with an invitation to join the conference by ringing a certain number. When the participants call back on the incoming/outgoing lines, their identity is checked, preferably automatically by means of calling line identity signals, with the numbers in the store, and only in the event of a match is each participant allowed to join the conference. For additional security, the participants may also need to enter a specific PIN, which may have been read out by the stem during the invitation to join the conference.

23 Claims, 1 Drawing Sheet

TELEPHONE CONFERENCING SYSTEMS

Figure 1:
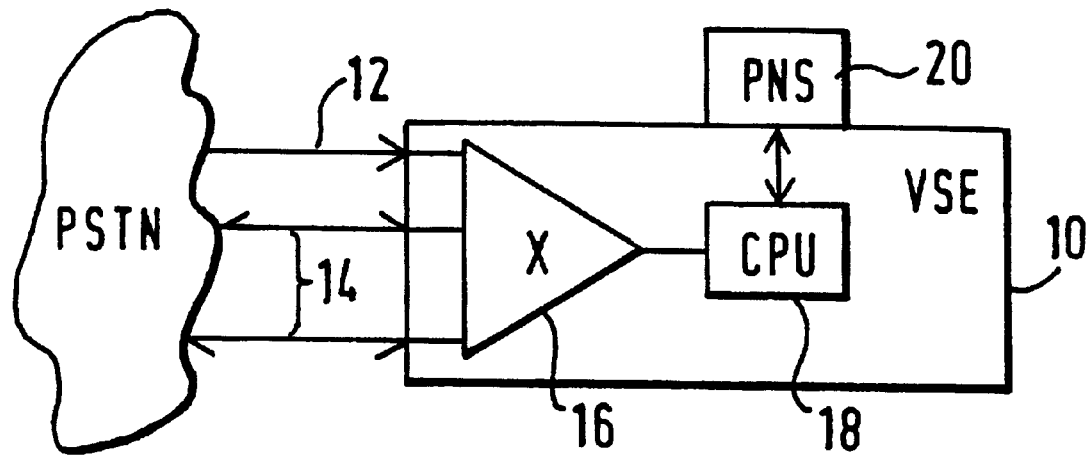

This invention relates to telephone conferencing systems that enable a number of callers to participate in a conference by means of telephones.

Telephone or audio conferencing allows three or more people to participate in a single telephone conversation. Each person is able to hear all the other callers when they speak and the conversation can progress as if all the callers were in the same room.

Audio telephone conferencing systems exist for connection to both the analogue and digital telecommunications networks. These systems use either analogue bridges or digital signal processing to combine the audio from three or more callers and play it to all participants in the conference.

With the advance of digital systems, more complex algorithms have been employed to improve the quality of the speech heard by each caller. Some of these advances include automatic gain control (AGC), speaker detection and echo cancellation.

Existing conferencing systems have two basic market areas, business conferencing and social chatlines. Business conferencing can be provided as a public service by the network operator, or provided locally from a company's PABX. Chatlines are usually provided by independent service providers to callers who pay a premium rate for the call whilst accessing the service. The telephone numbers for chatlines are extensively advertised and there is no restriction on callers wishing to access the service, as long as the telephone being used has not been barred from initiating premium rate calls.

At present, there is no system available for residential or domestic use. In theory, the subscription services for business use could be utilised for domestic use, but these have to be booked in advance. Moreover, the initiator of the telephone conference bears the telephone charges for all participants; for domestic use, it would be preferable for individual participants to bear the costs of their own calls. Even if an automated system were to be developed which would dial out to desired participants (on the basis of telephone numbers input by the conference initiator), the charging problem would still exist in that it would be difficult (and, even if technically feasible, arguably unreasonable) for the call charges to be born by individual participants as opposed to the conference initiator. Moreover, even if this were to be acceptable, billing integration of the individual parts of the conference call could be difficult to implement.

According to the invention there is provided a telephone conferencing system comprising a voice services equipment having a processing means and storage means for storing identifying codes indicative of desired participants to a telephone conference, wherein the processing means is operable
  (i) to request the identifying codes of the desired other participants from the initiator of the conference, and forward the identifying codes to the storage means,
  (ii) to initiate telephone calls to the desired participants notifying them of the conference and requesting them to call back, and
  (iii) to receive the returned calls, compare the identifying codes associated with the returned calls with those stored in the storage means, and enable connection to the conference only if particular identifying codes associated with the returned calls match those stored in the storage means.

In a preferred embodiment of the invention, the identifying codes are calling line identity (CLI) signals automatically sent to the system from the callers' telephones. Thus only those people who have been "invited" to the conference can participate, since all other telephones with different CLIs will be barred.

Since the participants to the telephone conference call in upon being invited to do so, each participant will bear the costs of their contribution to the conference call.

The telephone conferencing system can be utilised to initiate video conferences or data conferences, as well as audio conferences.

Figure 2:
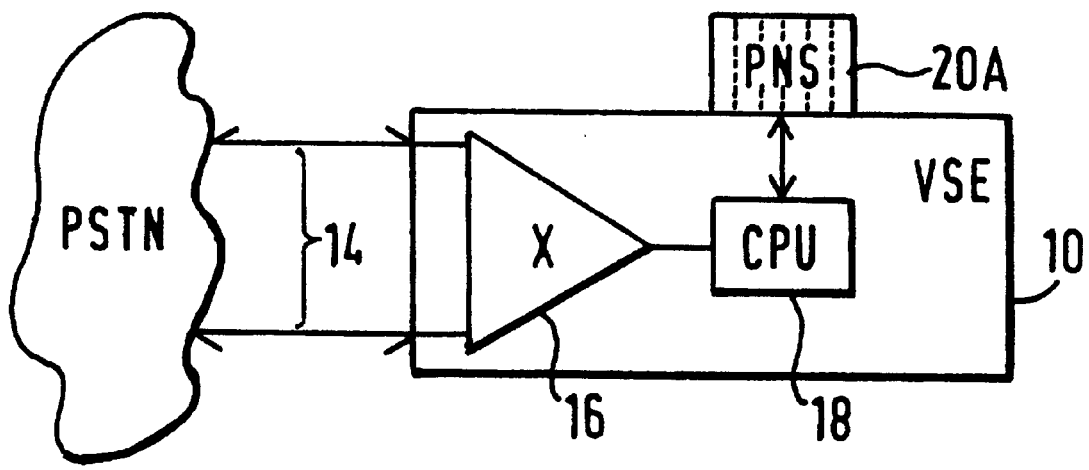

The invention will now be described by way of example with reference to the accompanying drawings, throughout which like parts are referred to by like references, and in which:

FIG. 1 is a schematic block diagram of a telephone conferencing system according to one embodiment of the invention; and FIG. 2 is a diagram similar to that of FIG. 1, but relating to a second embodiment.

Referring to FIG. 1, a telephone conferencing system comprises a voice services equipment (VSE) 10 having one incoming line 12 and a plurality of incoming/outgoing lines 14, each line being connected to the public switched telephone network (PSTN). All the lines 12, 14 are connected via a telephone switch 16 to a central processing unit (CPU) 18 of the VSE 10. The telephone switch 16 allows programmed switching between one or more selected lines and/or functions of the VSE 10, these functions being known in the art and so not shown specifically in the drawing. The VSE 10 may, for example, be a Telsis Hi-Call, some aspects of which are described in International Patent Application Publication No. WO92/22165. As shown in FIG. 1, a participant number temporary store 20 is connected to the CPU 18. The store 20 can be external to the VSE 10 or can be constituted by internal memory of the VSE 10.

In operation, the initiator of the conference calls in on the incoming line 12 by dialling, for example, "951951". A voice message from the VSE 10 greets the caller and requests the telephone numbers of the desired other participants to the telephone conference and also the caller's name. Following the necessary prompts, the initiator can enter these telephone numbers by using the number keys on the telephone, or possibly by voice if the system has voice recognition capability. The CPU 18 stores the telephone numbers in the participant number temporary store 20 and the caller's name in the usual disc store. The system then dials out to these numbers on the incoming/outgoing lines 14, gives the (recorded) name of the initiator, and invites those answering to join the conference call by dialling, for example, "950950". When the participants call back on that number, a comparison is made so as to ensure that the calls are from the invited numbers. Preferably, in systems generating CLI, this can be done automatically by the system which will compare the CLI from each call with the numbers in the store 20 and allow access only to those calls that match. When access has been allowed, the switch 16 will connect together each authorised reply call to the conference. Since each participant to the conference has individually dialled in, the costs of each contribution to the conference can be born by that caller. In order to increase the flexibility of the service, different systems could be provided for different area codes such that, for example, the conference initiator could choose the optimum system. Thus, for example, it may be preferable for the initiator to call "01489 951951" even though the initiator is in area code "01703", if all or most of the other participants are in area code "01489". Most participants may then only be charged at local call rates.

The telephone conferencing system may provide the ability to predefine groups of telephone numbers which can be accessed easily, such as by the use of short codes to be input by the conference initiator. Thus, if telephone conferences are often arranged between the same (or at least some of the same) participants, this facility will significantly simplify the setting-up operation.

If additional call security is desired, entry to the conference may be enabled only upon input of a predetermined PIN (personal identity number). For example, in the system described above with reference to FIG. 1, the operation may be modified so that, when the system dials out to the numbers previously entered by the conference initiator, as well as inviting the answering party to join the conference call, for example by dialling "950950", the system also reads out a unique PIN and informs the party that the PIN will need to be entered in order to join the conference. The PIN may then be associated in the store 20 with the telephone number(s) of the respective participant(s). When each participant calls back (for example, on "950950"), the above-described check is firstly performed to ensure that the call is from an invited number, such as by CLI comparison. Depending on the manner in which the system is set up, the prospective participant will either input the PIN immediately after the call-back number, or alternatively will be invited to do so by an appropriate voice prompt. The system then compares the PIN in the store 20 with that input by the respective participant on the corresponding telephone number, and entry to the conference is allowed only in the event of a matching comparison.

A further modification to the system, which involves modification of the network CLI sent to each invited participant, results in simplified call-back operation for the invited participants. If the network CLI is modified so that, when the system dials out to the telephone numbers of the invited participants, the CLI sent to those numbers incorporates the number to be called back (such as "950950"), it will then only be necessary for each participant to invoke the call-back function provided by the network, such as by dialling "14713" on the BT network, whereupon the participant will be connected to the system and, assuming that the CLI comparison (and any PIN checking, if appropriate) is positive, the participant will be enabled entry to the conference.

However the system is configured, the conference originator will preferably have the option of accepting or refusing access to the conference when each called party requests to join the conference. This is in case the person answering the invitation telephone call from the system was not the intended party.

FIG. 1 illustrates a system suitable for handling a single conference call. More flexibility is provided by the system of FIG. 2 which can handle a number of different conference calls. This can be done either by providing as many incoming-only lines (951951) as the maximum number of conferences to be handled by the system, or by having no dedicated incoming lines, as shown in FIG. 2, only bi-directional incoming/outgoing lines 14; in the latter case, the system must be suitably programmed to ensure that there is always sufficient line availability (i) for the system to be able to dial out to the required participants, and (ii) for the participants to be able to call back on the "950950" number. In other respects, the system of FIG. 2 is similar to that of FIG. 1 except that the participant number store 20A is divided into a number of conference call areas, each area corresponding to a particular conference call. When the participants call back, the CLI comparison with the contents of the store 20A will identify which of the conferences each participant is to join, and the switch 16 makes the appropriate connection depending on the comparison. If PIN entry is required by the system, the store 20A will also hold the associated PIN for each invited participant, as previously described with reference to FIG. 1.

The service provider can select the operational modes in respect of different eventualities, such as the system receiving no reply when dialling out, or receiving an engaged signal. Likewise, the system may provide for people being added to the conference once it has started, if the participants so desire.

FIGS. 1 and 2 show the system connected to the public switched telephone network. However, it will be clear that the system could alternatively or additionally be connected to other types of network, such as private or mobile networks.

Although the system has been described in the context of audio conferencing, the principles of the invention can similarly be applied to video conferencing and data conferencing.

What is claimed is:

1. A telephone conferencing system comprising a voice services equipment having a processing means and storage means for storing different identifying codes indicative of different desired participants to a telephone conference, wherein the processing means is operable
   (i) to request the identifying codes of the desired other participants from the initiator of the conference, and forward the identifying codes to the storage means,
   (ii) to initiate telephone calls to the desired participants notifying them of the conference and requesting them to call back, and
   (iii) to receive the returned calls, compare the identifying codes associated with the returned calls with those stored in the storage means, and enable connection to the conference only if particular identifying codes associated with the returned calls match those stored in the storage means.

2. A telephone conferencing system according to claim 1, wherein the identifying codes comprise PIN codes to be entered during the returned calls in order to enable connection to the conference.

3. A telephone conferencing system according to claim 2, wherein the PIN codes are read out by the system during the telephone calls to the desired participants, and are stored in the storage means for subsequent comparison.

4. A telephone conferencing system according to claim 1, wherein the voice services equipment includes a voice store, and the initiator is requested by the voice services equipment to speak his/her name which is recorded in the voice store and then forms part of the spoken request to the desired other participants.

5. A telephone conferencing system according to claim 1, capable of handling a plurality of conferences, wherein the voice services equipment includes a switch for selective connection of the calls, the switch being operated in accordance with the comparison of the identifying codes so that the appropriately returned calls are connected to each respective conference initiator.

6. A telephone conference system according to claim 1, wherein the network calling line identity signal for the system is modified so that the desired participants can return the call by invoking a call-back function.

7. A telephone conferencing system according to claim 1, including means for predefining groups of telephone numbers of desired participants.

8. A telephone conferencing system according to claim 1, wherein the telephone conference to be initiated is an audio conference.

9. A telephone conferencing system according to claim 1, wherein the telephone conference to be initiated is a video conference.

10. A telephone conferencing system according to claim 1, wherein the telephone conference to be initiated is a data conference.

11. A telephone conferencing system according to claim 1, wherein the identifying codes comprise calling line identity signals received with the returned calls.

12. A telephone conferencing system comprising a voice services equipment having a processing means and storage means for storing identifying codes indicative of desired participants to a telephone conference, wherein the processing means is operable
   (i) to request the identifying codes of the desired other participants from the initiator of the conference, and forward the identifying codes to the storage means,
   (ii) to initiate telephone calls to the desired participants notifying them of the conference and requesting them to call back, and
   (iii) to receive the returned calls, compare the identifying codes associated with the returned calls with those stored in the storage means, and enable connection to the conference only if particular identifying codes associated with the returned calls match those stored in the storage means;
wherein the identifying codes comprise calling line identity signals received with the returned calls.

13. A telephone conferencing system according to claim 12, wherein the identifying codes comprise PIN codes to be entered during the returned calls in order to enable connection to the conference.

14. A telephone conferencing system according to claim 13, wherein the PIN codes are read out by the system during the telephone calls to the desired participants, and are stored in the storage means for subsequent comparison.

15. A telephone conferencing system according to claim 12, wherein the voice services equipment includes a voice store, and the initiator is requested by the voice services equipment to speak his/her name which is recorded in the voice store and then forms part of the spoken request to the desired other participants.

16. A telephone conferencing system according to claim 12, capable of handling a plurality of conferences, wherein the voice services equipment includes a switch for selective connection of the calls, the switch being operated in accordance with the comparison of the identifying codes so that the appropriately returned calls are connected to each respective conference initiator.

17. A telephone conference system according to claim 12, wherein the network calling line identity signal for the system is modified so that the desired participants can return the call by invoking a call-back function.

18. A telephone conferencing system according to claim 12, including means for predefining groups of telephone numbers of desired participants.

19. A telephone conferencing system according to claim 12, wherein the telephone conference to be initiated is an audio conference.

20. A telephone conferencing system according to claim 12, wherein the telephone conference to be initiated is a video conference.

21. A telephone conferencing system according to claim 12, wherein the telephone conference to be initiated is a data conference.

22. A telephone conferencing system comprising a voice services equipment including:
   a storage which stores different identifying codes indicative of different desired participants to a telephone conference; and
   a processor which requests the identifying codes of the desired other participants from the initiator of the conference, forwards the identifying codes to the storage, initiates telephone calls to the desired participants notifying them of the conference and requesting them to call back, receives the returned calls, compares the identifying codes associated with the returned calls with those stored in the storage, and enables connection to the conference only if particular identifying codes associated with the returned calls match those stored in the storage.

23. A telephone conferencing system according to claim 22, wherein the identifying codes comprise calling line identity signals received with the returned calls.

* * * * *